F. R. SOMMER AND E. K. SKONBERG.
PORTABLE ENGRAVING MACHINE.
APPLICATION FILED AUG. 22, 1919.

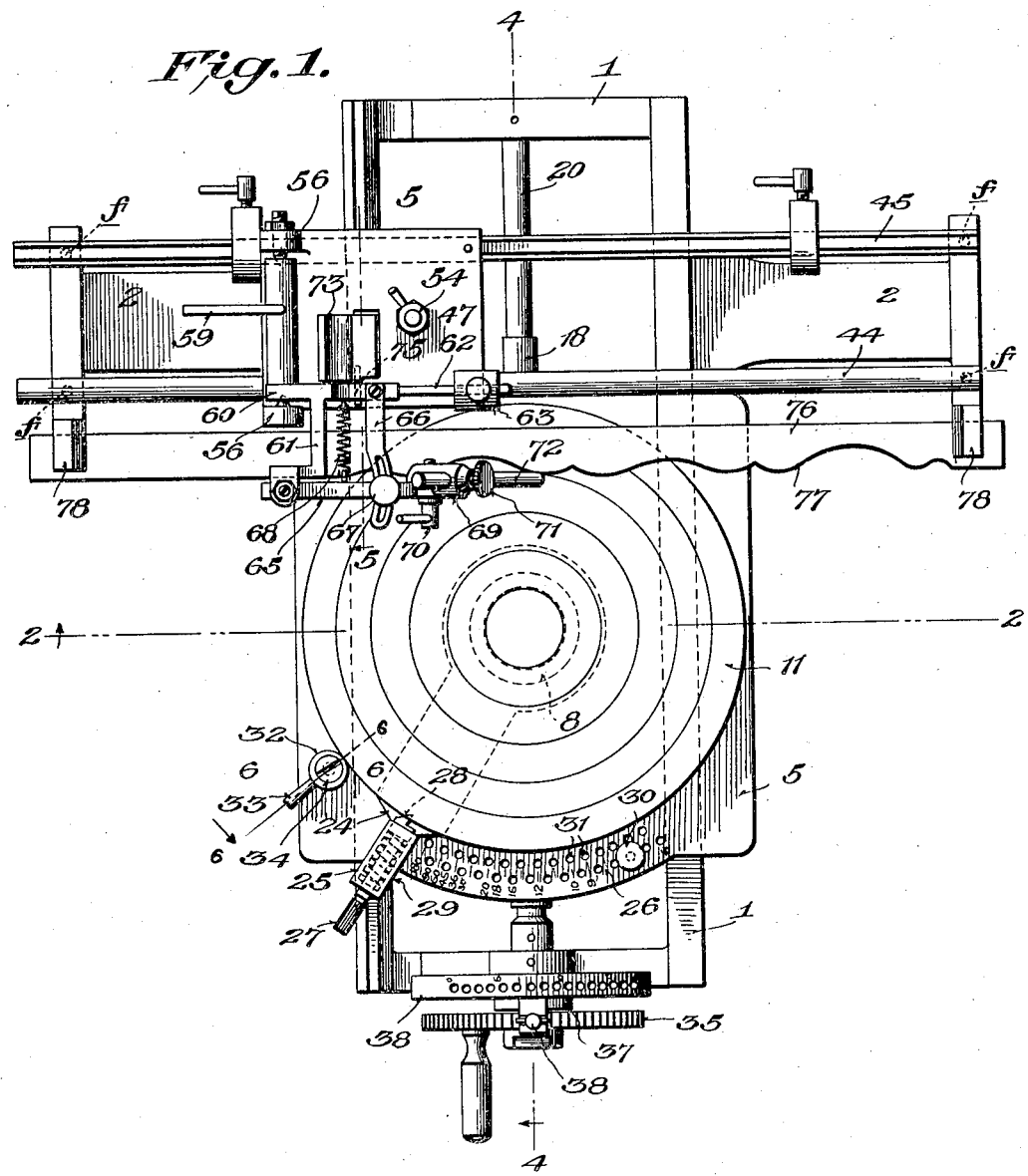

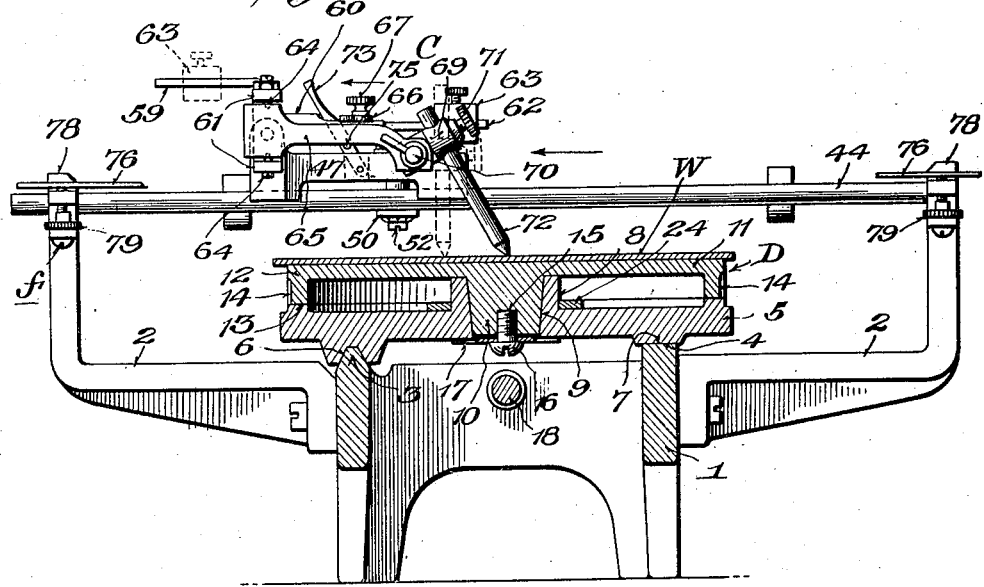
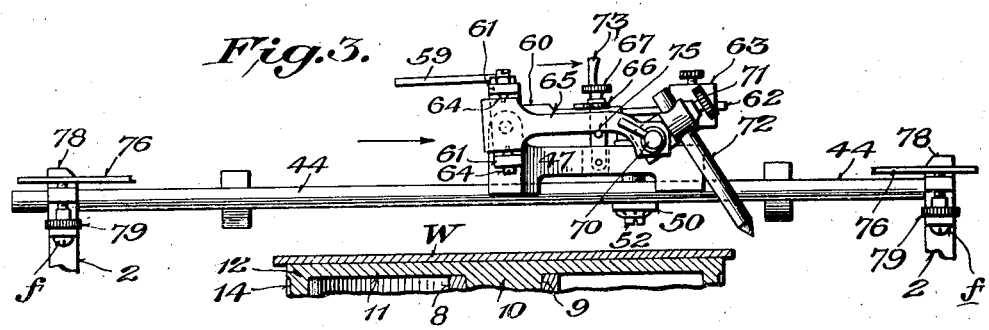
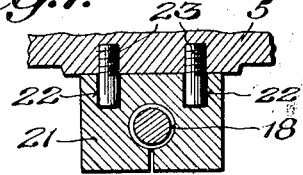

1,356,796.

Patented Oct. 26, 1920.

Witness

Inventors
F. R. Sommer,
E. K. Skonberg,
By
Attorney

UNITED STATES PATENT OFFICE.

FRED R. SOMMER AND ERIK K. SKONBERG, OF BROOKLYN, NEW YORK.

PORTABLE ENGRAVING-MACHINE.

1,356,796.  Specification of Letters Patent.  Patented Oct. 26, 1920.

Application filed August 22, 1919. Serial No. 319,221.

*To all whom it may concern:*

Be it known that we, FRED R. SOMMER and ERIK K. SKONBERG, citizens of the United States, residing at Brooklyn, in the county of Kings and State of New York, have invented certain new and useful Improvements in Portable Engraving-Machines, of which the following is a specification.

This invention relates to improvements in engraving machines, and has special reference to a portable type which may be readily transported or carried from place to place to suit the engraver's convenience.

A primary object of the invention is to provide an engraving machine having a novel cutter carrying carriage which automatically raises and lowers the cutter by the same movement that is necessary to change the direction of travel thereof. In this connection the invention also contemplates a novel arrangement whereby the cutter may be employed to do curve line work as well as straight line ruling without interfering with the raising and lowering of the cutter as above set forth.

A further object of the invention is to provide a novel arrangement whereby the work carrying table or platen may be readily detached from the machine to facilitate the removal of the ruled or marked plate, and also permit of the substitution of one platen for another to expedite the engraver's work. That is to say, since the plate to be engraved is held on the platen by wax it is the custom to heat the platen to remove the plate, and to save time it is desirable to use a fresh platen while the heated one is cooling.

A still further object of the invention is to provide simple and accurate adjusting means for the platen which will not be effected by the relatively sharp taps or blows incident to the movement of the feed levers against the check or stop which marks the desired limit of movement of the said feed levers.

Other objects aside from the foregoing special objects will become readily apparent as the nature of the invention is better understood.

A preferred and practical embodiment of the present improvements is shown in the accompanying drawings in which:—

Figure 1 is a plan view of our improved machine.

Fig. 2 is a vertical sectional view taken on the line 2—2 of Fig. 1.

Fig. 3 is a detail view illustrating the travel of the carriage from a reverse direction from that shown in Fig. 2, and in which movement the cutter is held elevated and out of contact with the work.

Fig. 7 is a detail sectional view showing the connection between the shiftable work-carrying platen and the feed screw.

Similar reference characters designate corresponding parts throughout the several figures of the drawings.

Figure 4:
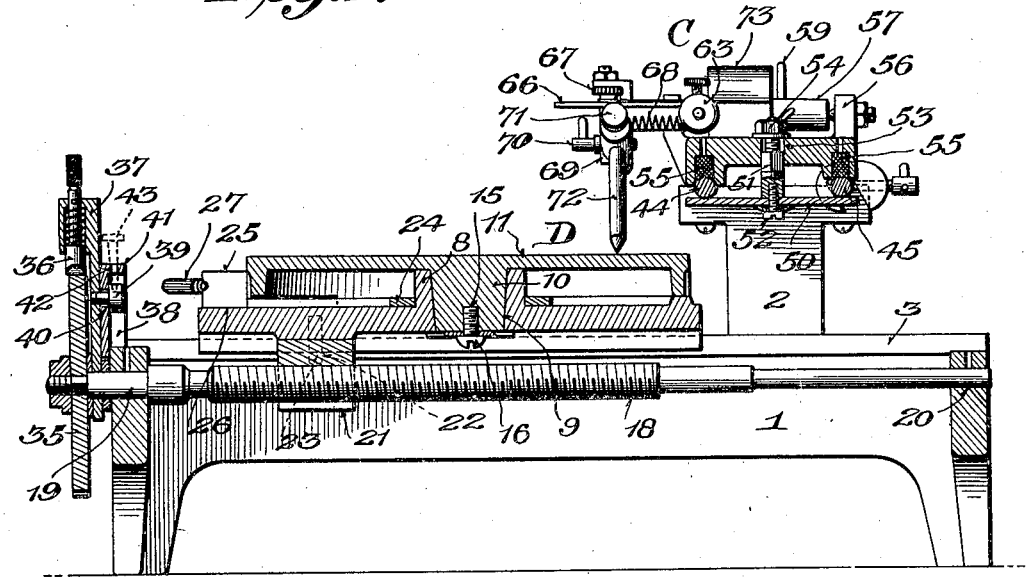
Fig. 4 is a vertical sectional view taken on the line 4—4 of Fig. 1.

In carrying the present invention into effect it is proposed to provide a supporting bed or frame 1 of substantially rectangular formation and having secured to the opposite sides thereof adjacent one end the upstanding cutter-carriage trackway supporting arms or brackets 2, whereby the said cutter carrying carriage designated generally as C may be mounted to have a movement transversely of the frame 1 and above the work-carrying platen unit D. The said work-carrying platen D is slidably mounted on the frame 1 to move longitudinally thereof and at right angles to the carriage C, and for the purpose of providing for the accurate shifting of the platen the said frame 1 is formed with the opposite rails 3 and 4, the former being preferably of a substantially peaked formation in cross section while the latter is flat whereby the relative wear between the platen unit and the frame may be compensated for and distributed in the most effective manner.

The platen unit D preferably includes in its organization a base member 5 formed with the rail engaging shoe portions 6 and 7 for slidably engaging the rails 3 and 4, while the central portion thereof is formed with an upstanding collar 8 and a tapered opening 9 for receiving a correspondingly tapered hub or spindle portion 10 of a rotary platen member 11. The said rotary platen member 11 is preferably provided with a depending skirt or flange portion 12 whose lower edge is adapted to have a free traveling engagement with an upstanding rim or bead portion 13 of the base 5, while its external circumferential surface is provided with a plurality of vertical feeding notches 14 adapted to coöperate with a suitable feeding device to be presently referred to, to rotate the platen on the base for the desired distance to meet the requirements of the work under execution. For the purpose of preventing undue rotary movement of the platen 11, the central hub portion 10 is provided with a suitable axially located screw threaded socket 15 for receiving a fastening 16 that holds a friction washer 17 in contact with the underside of the base 15. It will therefore be apparent that by reason of the tapered fit of the hub into the base and the friction washer 17, the entire platen 11 is frictionally held on the base and may only rotate when propelled by the operator.

To provide for the shifting of the platen unit D on the frame 1 a feed screw 18 is employed, and as shown in Fig. 4 of the drawings the opposite ends 19 and 20 are journaled in the end walls of the frame 1. The said feed screw 18 carries therewith a feed nut 21 and the same is provided with one or more sockets 22 in one face thereof for removably receiving the positioning pins 23 carried by the underside of the frame 5 of the platen unit. With this arrangement it will be apparent that since the entire platen unit has a free riding engagement on the rails 3 and 4 of the frame and also has a detachable connection with the feed nut 21 it is possible to remove the entire platen unit independently of any other mechanism and substitute another one if desired.

Again referring to the platen unit D it will be observed that the same may be rotated on the base 5 through the provision of a novel lever and stop arrangement which is clearly shown in Figs. 1 and 4 of the drawings. That is to say, the upstanding collar portion 8 of the base 5 constitutes a pivot axis for one end of a feed lever 24 which lies flat on the upper surface of the base 5 and projects through a cut-away portion of the rim 13 whereby its gage side 25 may pass over a suitable scale 26 formed on an arcuate scale extension of the base 5. The gage end of the lever 24 carries therewith a spring pressed detent or feed pawl 27 whose latch end 28 is adapted to engage with the notches 14 in the skirt or flange portion of the platen 11, and for the purpose of rotating the said platen only the desired portion of a circle, the gage edge 29 of the device 27 coöperates with a pin or key 30 which may be inserted in any one of a plurality of openings 31 opposite the indicia on the scale 26. Obviously, since the pin 30 may be firmly pushed into one of the openings 31, it cannot be moved or shifted out of place by the relative tapping or hammering action of the gage side 29 of the lever 24 when the same is constantly shifted by the operator to intermittently rotate the platen.

Figure 6:
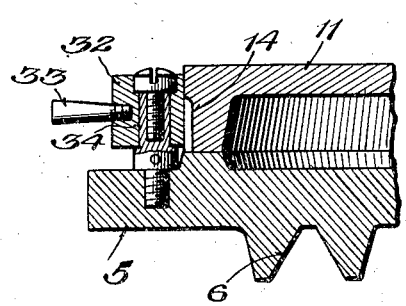
Fig. 6 is a cross sectional view taken on the line 6—6 of Fig. 1.

From the foregoing it will be apparent that circular line work may be accomplished by shifting the platen 11 through the aid of the spring pressed pawl or feeding device 25 which has a ratchet action on the return stroke by reason of the particular disposition of the latch end 28. Although the platen 11 will remain stationary by reason of the friction mounting on the bed 5 except when it is shifted by the lever 24, it is proposed to provide a positive lock which may be brought into use when straight line work is desired. This lock may be of any desired and suitable type but is preferably an eccentric 32 shown in Figs. 1 and 6 and having an operating handle 33 whereby it may be rotated on its supporting spindle 34 to have a binding engagement with the peripheral edge portion of the platen flange 12. This positive lock for the platen is regarded as of material importance to insure absolute accuracy in the execution of straight line work, since it guards against any accidental movement or creeping of the carriage through carelessness of the operator or otherwise.

In connection with the feed screw 18 which shifts the platen unit longitudinally of the frame it is to be observed that the end 19 thereof has suitably fitted thereto a driving gear wheel 35 which is adapted to be engaged by the ratchet pawl 36 of a manually operated feeding lever 37 loosely mounted on the end 19 of the screw shaft 18 between the wheel 35 and a scale part or member 38 carried by the frame. As shown in Fig. 4 the arm of lever 37 carries a stud 39 projecting through an arcuate slot in the wall of scale member 38 to thereby move beneath the flange 41 thereof which is provided with openings 42 for receiving a stop pin 43 whose lower end projects down into the path of movement of the stud 39 and constitutes an abutment or stop for limiting the movement of the oscillatory feed lever 37. With the arrangement described it will be apparent that upon the manipulation or rocking of the lever 37 by the operator, the feed screw 18 will be intermittently rotated to advance the platen unit D regular distances at the proper spaced intervals. Obviously, by setting the stop pin 43 at the desired place on the scale, any desired number of stops may be made within an inch, according to the number of lines per inch to be ruled. By reason of the relative longitudinal and rotary movement of the platen D within the frame it will be apparent that any desired combination and arrangement of curved or straight lines can be made by the cutter mounted on the carriage C, according to the range of adjustment provided by the scales 26 and 38.

Figure 5:
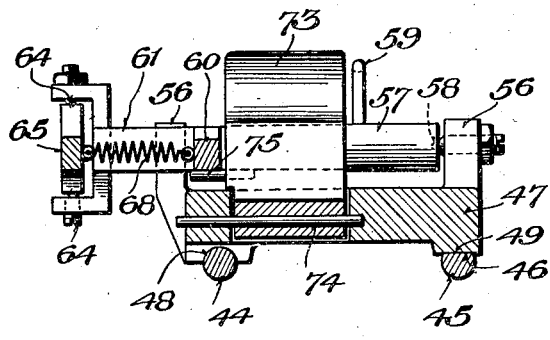
Fig. 5 is a vertical sectional view taken on the line 5—5 of Fig. 1.

Referring now to the novel carriage unit C it will be observed from the several figures of the drawings, that the entire unit has a relatively free slidable mounting on the tracks 44 and 45 which are secured to the supporting arms or brackets 2 by screws or equivalent fastenings f, and as will be seen from Figs. 4 and 5 the track 44 has a curved or equivalent tread portion while the track 45 is flattened as at 46 to obtain the same advantageous results in the distribution and take-up of wear, as exists in connection with the mounting of the platen unit D on the frame.

The cutter unit C essentially includes in its organization a platform 47 having the track-engaging portions 48 and 49, and for the purpose of preventing accidental displacement of the carriage from the track, and also holding it stationary when the cutter is set for circular work, a novel guard unit is provided. This guard unit preferably consists of a clamping member 50 which is secured to a clamping post 51 by means of a screw or equivalent fastening 52 while the said post 51 has a square portion fitting within a square opening 53 in the platform of the carriage and provided with an adjustable clamping nut 54 at its upper end. Because of the fact that the clamping member 50, which is preferably resilient, is rotatably mounted on the end of the post 51, it will be apparent that the same may be turned longitudinally of the carriage when the same is placed on the tracks so as to clear the same, and then when the carriage is in position it may be turned transversely thereof as shown in Fig. 4 and the clamping nut 54 tightened-up to hold the carriage stationary if desired. Of course if it is not desired to hold the carriage in a fixed position the tension nut 54 may be loosely placed in position so that the opposite ends of the clamping member 50 will not have a firm binding engagement with the under sides of the tracks 44 and 45, but will simply exert a frictional holding pressure which will permit the shifting of the carriage, and yet at the same time prevent its accidental displacement.

To facilitate the free shifting of the carriage on the tracks 44 and 45 suitable lubricating wicks 55 may be employed as shown in Fig. 4. The arrangement of the wick 55 or equivalent lubricant holders is such that oil inserted in the openings above the same in the platform will be retained and fed onto the tracks as required.

A novel and distinctive feature of the carriage unit exists in connection with the cutter carrying frame which is pivotally mounted in the upstanding pivot ears 56 of the platform. This cutter carrying frame includes a main pivot shaft 57 pivotally mounted as at 58 between the said ears 56 and carries therewith an offset weight arm 59 and an oppositely extending rigid supporting arm 60, the former being of angular formation as shown in Figs. 2 and 3, and the latter having a laterally offset bracket 61 at one side thereof and a weight arm 62 extending longitudinally therefrom. Since the weight arms 59 and 62 extend radially on opposite sides of the pivots 58 it will be apparent that a weight 63 adjustably carried by either one of said arms will cause more or less downward pressure to be exerted on the rigid supporting arm 60 according to the position of the weight 63. That is to say, if the weight 63 is carried on the arm 62 as shown in Fig. 1, the rigid supporting arm 60 will have a tendency to exert a maximum downward pressure in a clockwise direction, but on the other hand if the weight 63 is carried by the arm 59 as shown by the dotted lines in Fig. 2 the weight of the weight of the rigid supporting arm 60 and the parts carried thereby will be counter-balanced more or less according to the position of the weight on said arm 59. The purpose of this arrangement is to impose more or less weight on the cutter carried by the frame to make light or heavy lines as desired.

The supporting bracket portion 61 of the rigid arm 60 is provided with the vertically disposed pivot elements 64 for mounting a swinging cutter carrying arm 65. This swinging cutter carrying arm by reason of its particular mounting in the bracket 61 may therefore have a horizontal movement as well as a vertical movement for the purpose of making wave lines or adjusting the cutter at a greater or less lateral distance from the carriage. To facilitate the clamping and holding of the cutter carrier 65 in a stationary position when straight line ruling is to be carried out, a clamping member 66 carried by the supporting arm 60 and having a slotted end portion to receive clamping screw 67 on the swinging cutter carrier 65 may be employed. Also for the purpose of tensioning the laterally swinging cutter carrier 65 a spring 68 may be fastened to the inside face of the carrier and the rigid supporting arm 60. Thus when the clamping screw 67 is loosened the swinging cutter carrier 65 is free to move under the tension of the spring 68, but on the other hand when the set screw 67 is tightened the swinging cutter carrier will be maintained in a fixed position.

The relatively free end portion of the swinging cutter carrier has a cutter holder 69 pivoted thereto as at 70 and the said holder is provided with a clamping screw 71 for holding a diamond point cutter 72 in position. By reason of the adjustment made possible through the manipulation of the clamping pivot 70 the cutter holder 69 may be adjusted so that the cutter 72 may be set in a perpendicular position as shown by the dotted lines in Fig. 2, or else assume the inclined position shown in full lines in that figure.

In order to enable the operator to shift the entire carriage unit C on the trackway between the stop clamps S, the same is provided with a manipulating handle 73, which is clearly shown in Figs. 2, 3 and 5 of the drawings and pivoted in an opening in the platform 47 by a pin 74 or its equivalent whereby it may have a free oscillating movement. Projecting from one edge of the handle 73 is a lifting pin 75 adapted to have a supporting and bearing engagement with the under side of the rigid supporting arm 60. In the normal position of the handle which is shown in Fig. 2 of the drawings, the same occupies an oblique relation to the upper surface of the platform 47 and when in this position the pin 75 holds the entire cutter carrying frame in a substantially horizontal position, and the cutter 72 is adjusted with reference to the work W on the platform so that its cutting point is in touching contact therewith.

When the handle 60 is raised to a substantially vertical position by the act of reversing the direction of the travel of the carriage, the pin 75 acts as a cam to lift the entire cutter carrying frame so as to elevate the cutting point of the cutter 72 (see Fig. 3). With the arrangement described it will be apparent that when the operator pushes the carriage in the direction of the arrow in Fig. 2 by holding onto the handle 73 the cutting point of the cutter will operate on the work. However, as soon as he has reached the end of the working stroke and desires to return the carriage for a fresh stroke, the act of reversing the movement of the carriage through the handle 73 causes the latter to assume the position shown in Fig. 3 to thereby hold the cutter elevated during the return stroke. This is a feature of practical importance since it increases the speed of operation of the machine since the operator merely has to synchronize the feed of the platen and the stroke of the carriage to make the desired cuts on the work.

A further feature of the invention is the provision of means for holding a fixed ruler in position on the bracket arms 2 which support the carriage trackway. As shown in Figs. 1 and 2 a ruler or guide strip 76 having a fancy edge 77 may be clamped between the slotted supporting ends 78 of the frame by means of suitable clamping screws 79 or their equivalent. Obviously, a ruler or strip of any design may be substituted for the one shown in the drawings, and because of the fact that the swinging cutter carrier 65 is under the tension of the spring 68 when released by the screw 67, it will be understood that the cutter will accurately and closely follow the edge 77 to make the desired design.

Without further description it is thought that the features and advantages of the invention will be readily apparent and it will of course be understood that changes in the form, proportion and minor details of construction may be resorted to without departing from the spirit of the invention or scope of the appended claims.

We claim:—

1. A portable engraving machine including a shiftable and rotatable platen unit, a rectilinearly movable cutter carriage unit mounted above the platen, a cutter carried by the carriage, and cutter shifting means inoperative during the forward stroke of the carriage to raise the cutter from contact with the platen and automatically operative to raise the cutter from the platen during the reverse stroke of the carriage.

2. A portable engraving machine including a shiftable and rotatable platen unit, a rectilinearly shiftable cutter carriage unit mounted above the platen, a cutter having a vertical and lateral adjustment in said carriage, and shifter means for the carriage adapted to automatically raise and lower the cutter.

3. A portable engraving machine including a shiftable and rotatable platen unit, a rectilinearly movable cutter carriage unit mounted above the same, a cutter carrying frame journaled in the carriage, a cutter carried by the frame, a propelling handle for the carriage, and means carried by the handle and engaging with said frame to elevate the latter upon the reverse stroke of the carriage.

4. A portable engraving machine including a shiftable and rotatable platen unit, a rectilinearly movable cutter carriage unit mounted above the platen unit, a cutter carrying frame pivoted transversely of the carriage to have a vertical movement therein and having a portion thereof pivoted to swing in a horizontal plane, a cutter adjustably carried by the horizontally swinging portion of said frame, a handle pivoted in the carriage parallel to the frame pivot and having a lateral projection adapted to engage said frame when the handle is moved to a vertical position to effect the reverse stroke of the carriage.

5. A portable engraving machine including a shiftable and rotatable platen unit, a rectilinearly movable cutter carriage unit mounted above the platen and including a platform having upstanding pivot ears at one end, a cutter carrying frame including a main shaft pivoted between said ears and having radial extensions disposed in opposite directions, a cutter carrier swingingly mounted in one of said extensions to move in a horizontal plane, a cutter fitted in said carrier, clamping means for holding the cutter in a stationary position with reference to the carriage, and a handle element pivoted in the platform and having a portion adapted to engage beneath one of said radial extensions to elevate the cutter carrying frame on the reverse stroke of the carriage.

6. A portable engraving machine including a shiftable and rotatable platen unit, a rectilinearly movable cutter carriage unit mounted above the platen and including a platform, a cutter carrying frame including a main shaft journaled between upstanding parts of the platform, radial extensions carried by said main shaft, a bracket carried by one of said extensions, a swinging cutter carriage mounted in said bracket and adapted to move in a horizontal plane, a cutter holder pivotally carried by the outer end of said cutter carrier, means for adjusting the swinging cutter carrier in a fixed position, a tension spring between the swinging cutter arm and one of the radial extensions and adapted to function when the stationary clamp means is released, and handle means for shifting the carriage.

7. A portable engraving machine including a shiftable and rotatable platen unit, a rectilinearly movable cutter carriage unit mounted above the platen and including a platform, a cutter carrying frame pivoted transversely of the platform and having radial extensions disposed in opposite directions, a cutter carried by the frame, and a weight adapted to be adjustably fitted to either one of said radial extensions to cause the cutter to exert a greater or less downward force.

8. A portable engraving machine including a bed frame, a rotatable platen unit shiftably mounted on said bed frame, track supporting brackets carried by the bed frame, tracks in said brackets, and a cutter carrying unit mounted on said tracks and including a platform, and an adjustable displacement preventing guard and setting device carried by the platform and adapted to engage with the under side of the track.

9. A portable engraving machine including a bed frame, a rotatable platen unit shiftably mounted on said bed frame, track supporting brackets carried by the bed frame, track means in said brackets, and a cutter carrying unit mounted on said tracks and including a platform, and a combined displacement preventing guard and setting device carried by the platform and including a clamping member adapted to be disposed transversely of the tracks beneath the same, a clamping post carried by said clamping member projecting through the platform, and an adjustable clamping nut carried by the upper end of the post and adapted to engage the upper surface of the platform to maintain the clamping member in frictional contact with the under side of the tracks.

10. A portable engraving machine including a shiftable and rotatable platen unit, a carriage trackway supported above the platen unit, a cutter carriage slidably mounted on said trackway, and a combined displacement preventing guard and setting device carried by the carriage and adapted to engage the tracks.

11. An engraving machine including a shiftable cutter carriage, tracks for the carriage, said tracks having respectively flat and peaked tread surfaces, and the cutter carriage including a platform having matching saddle portions for the tracks.

12. An engraving machine including a bed frame having supporting rails, a rotatable platen unit shiftably mounted on said rails and including a base carrying a lug, a feed screw journaled in the frame, a feed nut carried by the screw and provided with a socket for receiving the lug carried by the base of the platen unit.

13. An engraving machine including a bed frame having platen supporting rails, a rotatable platen unit shiftably mounted on said rails, said platen unit including a base, a feed screw journaled in the bed frame, a feed nut carried thereby, and means carried by the base of the platen unit for detachably engaging the feed nut.

14. An engraving machine including a bed frame having platen supporting rails, a rotatable platen unit shiftable on said rails and including a base provided with a centrally tapered opening, a platen having a work supporting surface and a depending flange portion resting on said base, a tapered hub portion carried by the central part of the platen and adapted to fit into said tapered opening of the base, and a friction washer carried by the hub portion and adapted to engage with the base to place the platen under tension.

15. An engraving machine including a bed frame having platen supporting rails, a rotatable platen unit shiftably mounted on said rails, and including a base having a central opening and an upstanding hub portion fitted in said central opening, a depending ratchet flange carried by said platen, a feed arm pivoted on the collar carried by the base, and a spring pressed detent element carried by the outer end of said lever and adapted to engage with the ratchet flange of said platen.

16. An engraving machine including a bed frame, a rotatable platen unit shiftably mounted thereon and including a base having an unstanding collar, a platen mounted on said base concentric with the collar and having a ratchet flange, a feed lever pivoted about the collar and extending to an exposed position from beneath the platen, a spring pressed detent carried by the free end of the lever and adapted to engage the ratchet flange of the platen, a gage extension formed at one end of the base provided with a plurality of gage holes, and a pin adapted to be fitted into any one of said holes to limit the extent of movement of the feed lever.

17. An engraving machine including a bed frame, a rotatable platen unit shiftably mounted on said frame, and including a base, a platen pivotally mounted on said base and frictionally held thereto, a feed lever adapted to engage with the periphery of the platen, and a locking device carried by the base and adapted to engage with the platen to hold the same stationary.

18. An engraving machine including a bed frame, a rotatable platen unit shiftably mounted on said frame, and including a base, a platen pivotally mounted on said base and frictionally held thereto, a feed lever adapted to engage with the periphery of the platen, and a locking device mounted on the base and consisting of an eccentric pivotally mounted adjacent to the periphery of the platen and adapted to be wedged into contact therewith to hold the said platen stationary.

In testimony whereof we hereunto affix our signatures in the presence of two witnesses.

FRED R. SOMMER.
ERIK K. SKONBERG.

Witnesses:
CARL A. KARLSON,
CARL G. SKONBERG.